United States Patent [19]

Dobigny et al.

[11] Patent Number: 4,594,288
[45] Date of Patent: Jun. 10, 1986

[54] OPTICAL LENSES HAVING A SCRATCH-RESISTANT COATING

[75] Inventors: Bernard Dobigny, Drancy; Jean-Pierre Mazzone, Saint Maur, both of France

[73] Assignee: Essilor International, Creteil, France

[21] Appl. No.: 636,549

[22] Filed: Aug. 1, 1984

[30] Foreign Application Priority Data

Aug. 3, 1983 [FR] France .................................. 83 12780

[51] Int. Cl.$^4$ ...................... B32B 27/36; C08F 26/06; G02C 7/16; B29D 11/00
[52] U.S. Cl. .................................. 428/339; 428/412; 428/913; 525/244; 522/44; 264/2.2; 351/45
[58] Field of Search ................................ 428/412, 339

[56] References Cited

U.S. PATENT DOCUMENTS

| | | | |
|---|---|---|---|
| 2,675,740 | 4/1954 | Barkley | 428/174 X |
| 4,366,207 | 12/1982 | Anthony | 428/412 |
| 4,373,076 | 2/1983 | Tarumi et al. | 428/442 |

*Primary Examiner*—P. C. Ives
*Attorney, Agent, or Firm*—Bucknam and Archer

[57] ABSTRACT

Lenses of allyl-N-ethylene glycol carbonate having enhanced resistance to scratching or abrasion can be formed by preparing a substrate of a polymer or copolymer of allyl-N-ethylene glycol carbonate, the substrate being at least partially polymerized. A thin film of a copolymer of allyl-N-ethylene glycol carbonate and of an allyl monomer is formed by overmolding on the substrate and polymerized.

11 Claims, No Drawings

OPTICAL LENSES HAVING A SCRATCH-RESISTANT COATING

This patent application relates to the field of optics and more particularly to the manufacture of optical lenses as well as to the lenses or glasses thus obtained.

The invention is more especially concerned with an improvement to lenses or optical glasses fabricated from organic compounds and more specifically from allyl-N-ethylene glycol carbonate. The invention relates more precisely to lenses or glasses formed by means of said allyl-N-ethylene glycol carbonate and adapted to an over-molding process. Overmolding forms part of the known techniques of manufacture of optical lenses or glasses. This process essentially consists of two steps. In a first step, the body of the lens itself is formed by machining to a suitable shape. In a second step, a thin film of the same material is formed on the lens body and polymerized while being maintained applied against a mold.

This method provides a solution to the problem arising from shrinkage of organic resins during their polymerization in a manufacturing process such that the nature of the articles being produced necessarily calls for very high precision in the shape and dimensions of finished articles which must also have a perfectly smooth surface. It is technically easier to obtain the smooth surface directly by molding. If the operation applies to a thin film as is the case in this instance, shrinkage does not have any major incidence. On the other hand, the total thickness of the lens body gives rise to a degree of shrinkage which is too high to permit direct molding to the final shape.

In the known methods of overmolding, the essential machining process is carried out on the basic body prior to formation of the final surface.

Thus U.S. Pat. No. 2,339,433 describes a process for forming optical surfaces on plastic material consisting of methyl methacrylate. In this process, a preform of methyl methacrylate is made by polymerization within a mold having the desired curvature. There is then placed between the mold and the preform thus obtained a "syrup" of the monomer of the preform or of a monomer-polymer mixture of said preform.

French Pat. No. 926,993 describes the manufacture of optical elements by means of a method which consists in making a preform of thermoplastic synthetic resin, then in placing between the preform and its mold a drop of "syrup" which is capable of dissolving and/or inflating the surface of said preform.

The "syrup" to be added contains a liquid polymerizable organic compound comprising one or a number of $CH_2=C>$ groups per molecule. Polymerization is then performed.

The preform can be constituted by methyl polymethacrylate or polystyrene. The "syrup" can contain methyl polymethacrylate, allyl or methyl methacrylate or diallyl fumarate.

In French Pat. No. 1,219,344, there has been described an improved process for molding optical elements which comprised initial rough molding in an approximate mold and at least partial polymerization of the monomer preform thus obtained. This is followed by grinding of said preforms and polishing in order to bring them to the optical formula which has been adopted. A complementary film of monomers is added to the surfaces which have thus been ground. This complementary quantity is then molded and polymerized in a mold which is suitable for the predetermined optical formula or in other words which has a precisely defined curvature and a perfect optical surface.

Finally, French Pat. No. 1,274,554, disclosed a method of manufacture of lenses of plastic material having scratch-resistant surfaces and the lenses obtained by means of said method.

This method consisted in manufacturing a basic core by means of a complex monomeric resin, the composition of which included on the one hand an unbreakable monomer and on the other hand a scratch-resistant monomer. The surface of said basic core was then treated with a suitable solvent which attacked said surface and made it more readily penetrable by a surrounding adhesive film of scratch-resistant monomer. After this surface attack by the solvent on the core of the object of complex monomer, said scratch-resistant monomer was applied on said core by dipping, spray-coating or the like.

The object thus coated with its abrasion-resistant film was transferred into an oven and complete polymerization of the entire object was then carried out.

These methods have not proved wholly satisfactory in any single instance. In particular, it has been impossible up to the present time to find reliable and economically satisfactory means for producing organic glasses or lenses, more particularly of allyl-N-ethylene glycol which offers a sufficient degree of resistance to abrasion.

The object of the present invention is to provide a solution to the problem thus presented.

The invention is more especially directed to a method for construction of a lens of organic material, comprising preparation of a substrate of polymer or copolymer of an allyl-N-ethylene glycol carbonate. In accordance with a distinctive feature of the invention, there is formed by overmolding on said substrate which has been at least partially polymerized a thin film of allyl-N-ethylene glycol carbonate copolymer and of a scratch-resistant allyl monomer which is polymerized.

It should be understood that the compound designated as an allyl-N-ethylene glycol carbonate is either an allyl-ethylene glycol carbonate or an allyl-diethylene glycol carbonate or an allyl-triethylene glycol carbonate.

In a preferred embodiment of the invention, the scratch-resistant allyl monomer is constituted by allyl methacrylate, triallylcyanurate, triallylisocyanate or ethylene glycolallyl-carbonate methacrylate.

It should also be understood that the scratch-resistant monomer is intended to designate a monomer which affords good resistance to abrasion after polymerization or copolymerization.

The thin-film polymerization phase can be catalyzed by isopropyl percarbonate, for example. However, in the event that the catalysis should be performed by photochemical process, it would be possible to employ a photoinitiator of the type

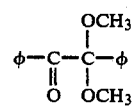

marketed by the Bayer Company under the trade name Irgacure or of the benzophenone type

The copolymer with which the thin film is formed can contain variable proportions of allyl-N-ethylene glycol carbonate and of allyl monomer.

The choice of these proportions can be determined by those versed in the art according to the results which it is desired to obtain and more particularly the degree of hardness and the abrasion resistance of the surface layer formed by overmolding on the lens.

It may nevertheless be stated that these proportions are suitably within the following ranges:

about 10% to about 90% of scratch-resistant allyl monomer, preferably 25% to 75% and more particularly 40% to 60% about 90% to about 10% of allyl-N-ethylene-glycol carbonate, preferably 75% to 25% and more particularly 60% to 40%, these proportions being expressed by weight in the foregoing and also in the remainder of this specification.

The catalyst which is intended to facilitate polymerization of the above-mentioned copolymer can represent about 2% to about 4% of the copolymer defined in the foregoing.

It has also been found that other constituents which are intended to give special properties to the thin film formed on the lens can be added to the copolymer of allyl-N-ethylene glycol carbonate and allyl monomer.

One constituent mentioned by way of example can be a colorant for the manufacture of tinted glasses or filter glasses. Another example consists of the photochromic compounds.

Further additions could be contemplated by those versed in the art provided that the constituents thus added are compatible with the allyl-N-ethylene glycol carbonate and the allyl monomer employed.

The invention is also directed to optical lenses constituted by a substrate of a polymer or copolymer of allyl-N-ethylene glycol carbonate. The distinctive feature of these lenses lies in the fact that they are further provided at least on one face with a thin film of a copolymer of allyl-N-ethylene glycol carbonate and of a scratch-resistant allyl monomer.

In a preferred embodiment of the invention, the allyl monomer is allyl methacrylate, triallylcyanurate, triallylisocyanurate or ethylene glycolallylcarbonate methacrylate.

The thin film can also contain a photochemical compound or a colorant.

In accordance with another distinctive feature of the invention, the thin film applied on the lens is of uniform thickness.

As can readily be understood, it is possible to form a thin film on each face of the lens concerned.

The invention is more particularly adapted to lenses in which the substrate is formed by an allyl-diglycol carbonate polymer, this compound being marketed by the P.P.G. Company under the commercial designation CR 39.

It will be readily apparent, however, that the invention also applies to lens substrates formed by copolymers having a base of CR 39, that is to say allyl-diglycol carbonates and more generally copolymers of allyl-N-ethylene glycol carbonate copolymers.

In this specification, the terms lenses or optical glasses are used indifferently and in a very broad sense as far as the latter expression is concerned. Indeed the lenses under consideration do not fall in the category of glasses since they are formed of organic material.

These lenses or glasses are essentially employed in the field of optics applied to mankind, more particularly for the fabrication of ophthalmic glasses or sun-glasses.

It should nevertheless be understood that the invention is equally applicable in the field of optics taken in its broadest sense.

The thickness of the thin film deposited on a lens is determined by those versed in the art according to the objectives which they desire to achieve.

It may be stated by way of example, however, that thicknesses of the order of 10 to 50/100 mm have been considered as suitable in the majority of instances for the fabrication of lenses having excellent scratch resistance. As a general rule, tnicknesses of the order of 15 to 20/100 mm prove satisfactory.

An explanatory illustration of the invention will now be given in the following description of particular modes of application of the method.

EXAMPLE 1

There was formed a core or substrate of CR 39, that is to say of allyl-diethylene glycol carbonate, also designated as allyl-diglycol carbonate.

Polymerization was performed in a regulated hot-water oven. This step will not be described in detail since it is well-known to those versed in the art and has been explained in particular in French Pat. No. 1,204,627.

However, the polymerization process was not carried on to completion but was stopped as soon as the shrinkage was of the order of 5% to 7%, which corresponded to a polymerization rate of approximately 40%.

The concave portion of the mold was removed, whereupon traces of water and flashes were eliminated in accordance with a known technique. There was then added on the convex face of the substrate one drop of a mixture comprising:

50% allyl methacrylate
46% allyl-diglycol carbonate
4% isopropyl percarbonate.

The concave face of the mold was then put back in position on the lens after interposing a seal having a thickness of 16/100 mm.

Polymerization was then performed under the same conditions as before.

After removal of the mold and cooling, the convex face of the lens was subjected to diamond scratch-resistance tests in accordance with the process described in the article by Michel Coulon and William Lenne entitled "Scratch resistance of optical polymers" and published in "Polymer Testing" 2- (1981), ps. 199–210.

The value of scratch resistance was found to be 1900.

EXAMPLE 2

A lens provided with a scratch-resistant thin-film coating was fabricated as in Example 1. In this case, however, the copolymer employed for the formation of this thin film had the following composition:

40% allyl methacrylate
56% allyl-diglycol carbonate
4% isopropyl percarbonate.

The scratch resistance was measured as before and was found to have a value of 1500.

EXAMPLE 3

Under the same experimental conditions as before, there was fabricated a lens coated with a thin film having the following composition:
  40% triallylcyanurate
  56% allyl-diglycol carbonate
  4% isopropyl percarbonate.
The scratch resistance of this lens was found to have a value of 1500.

EXAMPLE 4

A lens was fabricated in the same manner as in the preceding example. However, the scratch-resistant coating had the following composition:
  70% triallylcyanurate
  26% allyl-diglycol carbonate
  4% isopropyl percarbonate.
The thickness of the coating was 20/100 mm. Resistance to scratching by a diamond was 2100. Furthermore, the thin film was not scored by a 9H pencil.

These parameters have been compared with those of conventional CR 39 glasses (allyl-diglycol carbonate) and with those of glasses coated with a scratch-resistant varnish. Scratch resistance values were as follows:
  1000 in the case of a CR 39 glass
  1500 in the case of a varnished CR 39 glass.
Moreover, the glass of CR 39 was scored by a pencil having a hardness of 6H or 7H. The same glass but coated with varnish was scored by an 8H pencil.

EXAMPLE 5

The lens fabricated in this example was provided with a thin-film coating having the composition mentioned in Example 3. In this case, however, the substrate or core was formed by a copolymer having the following composition:
  85% allyl-diglycol carbonate
  15% triallylcyanurate.
The scratch resistance of the convex face was identical with the value mentioned in Example 3, namely 1500.

On the other hand, the value of scratch resistance of the concave face was 1150, which represented an improvement over the CR 39 glass, the scratch resistance of which is only 1000.

EXAMPLE 6

The surface coating of the lens produced in this example had the composition given in Example 2 but the lens core was formed by the following copolymer:
  95% allyldiglycol carbonate
  5% methyl methacrylate.
The concave face of this lens had a scratch resistance value of 1150 whilst the convex face had a value of 1500.

An extremely surprising result which has also been observed is that a lens provided with a thin-film coating in accordance with the invention exhibited enhanced scratch resistance as measured by a drop-ball hardness test.

The importance of this property should be emphasized inasmuch as an increase in scratch resistance or scratch hardness is accompanied in the majority of instances by a reduction in resistance as measured under drop-ball test conditions.

Lenses have also been made in accordance with the invention by incorporating the following additives in the mixture of allyl monomer and allyl-N-ethylene glycol carbonate:
  infrared-radiation absorbing products
  antifogging products.

In the examples described in the foregoing, it has been mentioned that the rate of polymerization of the allyl-diglycol carbonate was of the order of 40%. It will be understood that other polymerization rates made be found suitable.

A person who is versed in the art will determine the rate of polymerization required in each case and will take into account the following two essential requirements:
  polymerization should be sufficient to ensure that the lens of CR 39 has a sufficiently high degree of resistance and is capable of receiving the monomers which form the thin film,
  polymerization should not be complete in order to ensure that the thin film can in fact be effectively bonded to the lens.

As a general rule, the polymerization rate can be determined by the permissible degree of shrinkage which will usually be within the approximate range of 5% to 8%, and preferably 6% to 7%.

The polymerization techniques (that is to say determinations of temperatures, heating in ovens and processing times) form part of known techniques and will not be described in detail in this specification.

It will be readily apparent that the invention cannot be considered as limited in any sense to the specific embodiments mentioned in the foregoing and that other modifications could be made by any one versed in the art according to the aims to be achieved without thereby departing either from the scope or the spirit of the invention.

What is claimed is:

1. An optical lens constituted by a substrate of a polymer of copolymer of allyl-N-ethylene glycol carbonate, wherein said lens is further provided at least on one face with a thin film of a copolymer of the monomer allyl-N-ethylene glycol carbonate and of an allyl monomer, said thin film being obtained by applying to said substrate while still incompletely polymerized the blend of said monomer allyl-N-ethylene glycol carbonate and said allyl monomer and overmolding.

2. The lens according to claim 1, wherein the lens is first formed by partially polymerizing said substrate, in a second step said thin film is applied thereon and polymerization is carried out while the lens is maintained in the mold.

3. The lens according to claim 2 wherein said partial polymerization is carried out to a shrinkage of 5–8%.

4. A lens according to claim 1, wherein said allyl monomer is allyl methacrylate, triallylcyanurate, triallylisocyanate or ethylene glycolallylcarbonate methacrylate.

5. A lens according to claim 4, wherein the allyl-N-ethylene glycol carbonate is selected from allyl-ethylene glycol carbonate, allyl-diethylene glycol carbonate or allyl-triethylene glycol carbonate.

6. A lens according to claim 1 wherein the allyl-N-ethylene glycol carbonate is selected from allyl-ethylene glycol carbonate, allyl-diethylene glycol carbonate or allyl-triethylene glycol carbonate.

7. A lens according to claim 6, wherein the thickness of the thin film is within the range of 10 to 50/100 mm.

8. A lens according to claim 7, wherein the copolymer which forms the thin film comprises:

approximately 10% to 90%, preferably 25% to 75% and more particularly 40% to 60% by weight of allyl monomer approximately 90% to 10%, preferably 75% to 25%, and more particularly 60% to 40% by weight of allyl-N-ethylene glycol carbonate.

9. A lens according to claim 8, wherein the thin film further contains a photochemical compound.

10. A lens according to claim 9, wherein the thin film further contains a colorant.

11. A lens according to claim 10, wherein said thin film has a uniform thickness.

* * * * *